Patented June 14, 1938

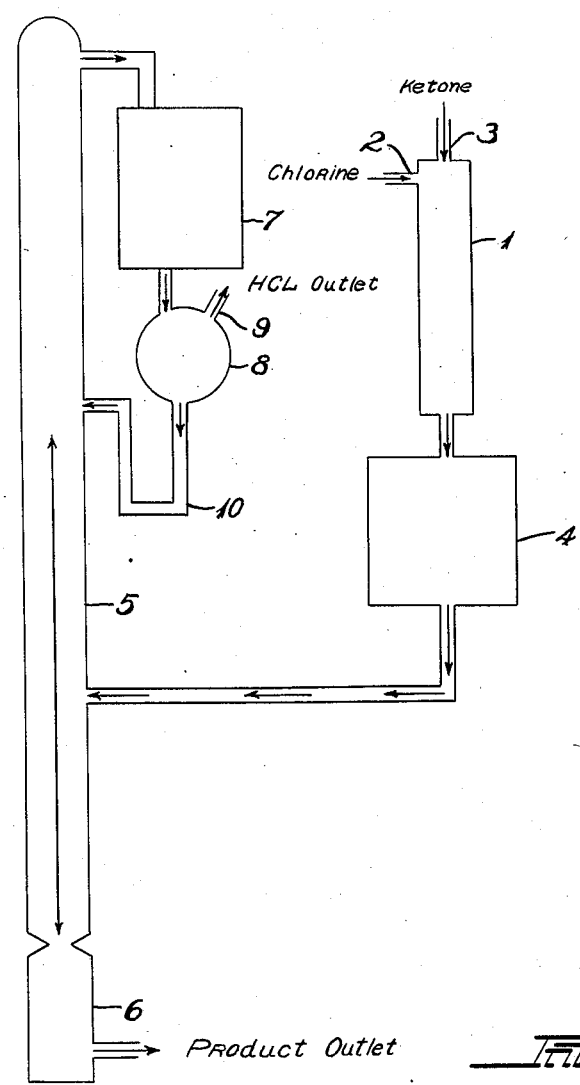

2,120,392

UNITED STATES PATENT OFFICE 2,120,392

CONTINUOUS PROCESS FOR THE CHLORINATION OF KETONES

Albert E. Calkins, Akron, Ohio, assignor to The B. F. Goodrich Company, New York, N. Y., a corporation of New York Application December 30, 1937, Serial No. 182,445

6 Claims. (Cl. 260—134)

This invention relates to the chlorination of ketones, and has as its object to provide a continuous process whereby high yields of monochloroketones may be obtained.

Previous methods for the preparation of monochloroketones have resulted in a product containing large quantities of by-products. Separation of the monochlorinated product was a very difficult and expensive procedure, since the product is very readily pyrolyzed when heated, especially in the presence of hydrogen chloride.

The process of this invention is characterized by the fact that the products are removed from the reaction zone and condensed immediately after the reaction has occurred. The invention may be better understood by reference to the accompanying drawing which illustrates diagrammatically my continuous process.

The reaction chamber 1 is packed with glass beads, Raschig rings, or with any other material which is free from iron or other substance having an adverse catalytic effect upon the reaction. The chlorine is admitted at 2 and is usually supplied from a conventional storage cylinder. The ketone in the gaseous state is admitted at 3, any kind of a heater or vaporizer (not shown) being used to vaporize the ketone. The ketone passes by the chlorine inlet and the mixture of vapors is swept on through the reaction chamber, preferably at a rapid rate in order to minimize the formation of dichlorinated products. The chlorine and ketone are preferably admitted in equimolar quantities, though an excess of either may be used. The reaction is exothermic, and to remove part of the heat evolved, the product is run through the condenser 4. The product issuing from the condenser comprises the liquid monochlorinated product with a small amount of dichlorinated by-product and contains dissolved therein varying quantities of chlorine, unreacted ketone, and hydrogen chloride. Some gaseous hydrogen chloride and some gaseous unreacted ketone may also be present in the product from the condenser. This product is then run into the vertical rectifying column 5 packed with Raschig rings or other packing and connected at the bottom with the heating chamber 6 and at the top with the condenser 7. While the product is passing through the column 5, dissolved hydrogen chloride is driven off. Any unreacted ketone and dissolved chlorine are vaporized in the rectifying column, thereby causing the remaining chlorine and ketone to react. The chlorinated products descend into the heating chamber 6 which is kept at a temperature slightly below the boiling point of the product. Any hydrogen chloride or unreacted ketones boil off and pass up through the rectifying column. The chlorinated product is drawn off from the heating chamber through a constant level device (not shown) into a receiver.

The vapors issuing from the top of the column 5 comprise unreacted ketone and hydrogen chloride. The ketone is liquefied in the condenser 7, and the hydrogen chloride is removed from the chamber 8 through the outlet 9. The chamber 8 is a storage chamber for unreacted ketones, and is connected to the column 5 by a liquid seal 10. If the chamber fills up with ketone, more chlorine is admitted into the reaction chamber. The ketone which is returned to the rectifying column is vaporized in the column and may react with any chlorine present.

The process of this reaction may be used to chlorinate any aliphatic ketone, whether or not it contains aromatic radicals. Illustrative of the ketones which may be chlorinated are acetone, 2-pentanone, 3-pentanone, 2-butanone, methyl isopropyl ketone, acetophenone, etc. The process is especially applicable to 2-butanone because its boiling point allows it to be vaporized and liquefied at atmospheric pressures and moderate temperatures. When 2-butanone is subjected to chlorination by the process of this invention, the product is much richer in 3-chlor-2-butanone than when chlorinated by previous processes. Although the literature reports that monochlorinated ketones have been obtained in very low yields, the yields obtained by the process of this invention are from 70–85% or even higher based upon the amount of ketone used. The monochlorinated butanones are valuable intermediates in the synthesis of thiazoles and other materials.

Although I have herein disclosed a specific embodiment of my invention, I do not wish to limit myself solely thereto, for it is obvious that many modifications such as changes in details of apparatus and variations in the conditions under which the chlorination is accomplished to suit the particular ketone involved are within the spirit and scope of the invention as defined in the appended claims.

I claim:

1. A continuous process of chlorinating aliphatic ketones which comprises introducing chlorine and a gaseous ketone into a reaction chamber, removing the product as soon as a reaction has occurred, cooling the product at least sufficiently to liquefy the chlorinated ketone, and passing the cooled product through a rectifying column.

2. A continuous process of chlorinating aliphatic ketones which comprises introducing approximately equimolar quantities of chlorine and a gaseous ketone into a reaction chamber, removing the product as soon as a reaction has occurred, cooling the product at least sufficiently to liquefy the chlorinated ketone, and passing the cooled product through a rectifying column.

3. A continuous process of chlorinating aliphatic ketones which comprises introducing chlorine and a gaseous ketone into a reaction chamber, removing the product as soon as reaction has occurred, cooling the product at least sufficiently to liquify the chlorinated ketone, and passing the cooled product through a rectifying column wherein the unreacted ketone and the hydrogen chloride are separated from the chlorinated product.

4. A continuous process of chlorinating aliphatic ketones which comprises introducing chlorine and a gaseous ketone into reaction chamber, removing the product as soon as reaction has occurred, cooling the product at least sufficiently to liquefy the chlorinated keytone, passing the cooled product through a vertical rectifying column, collecting the chlorinated product at the bottom of said column, removing gaseous unreacted ketone and hydrogen chloride from the top of said column, separating the hydrogen chloride and unreacted ketone by liquefying the ketone and collecting the unreacted ketone in a vessel connected through a liquid seal to the rectifying column.

5. A continuous process of chlorinating aliphatic ketones which comprises introducing chlorine and a gaseous ketone into a reaction chamber, removing the product as soon as reaction has occurred, cooling the product at least sufficiently to liquefy the chlorinated ketone, passing the cooled product through a vertical rectifying column, and collecting the chlorinated product at the bottom of said column in a chamber heated nearly to the boiling point of the chlorinated product.

6. A continuous process of chlorinating 2-butanone which comprises introducing chlorine and gaseous 2-butanone into a reaction chamber, removing the product as soon as a reaction has occurred, cooling the product at least sufficiently to liquefy the chlorinated 2-butanone, and passing the cooled product through a rectifying column.

ALBERT E. CALKINS.